Figure 1:
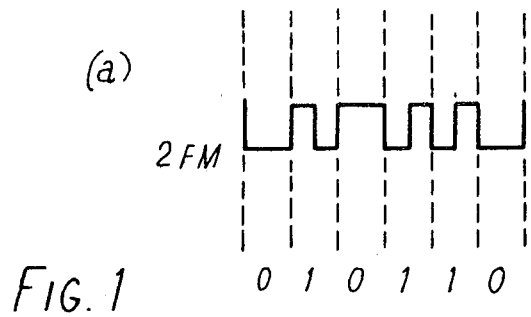
Figure 1:
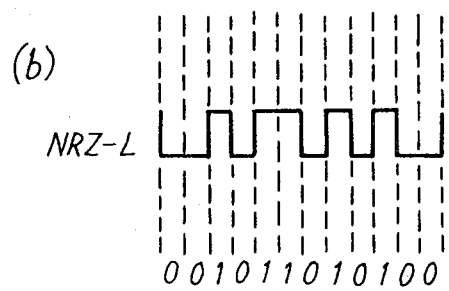

United States Patent [19]

Youhill

[11] 4,377,805
[45] Mar. 22, 1983

[54] MAGNETIC RECORDING

[75] Inventor: Paul Youhill, Weston Super Mare, England

[73] Assignee: EMI Limited, Hayes, England

[21] Appl. No.: 255,507

[22] Filed: Apr. 20, 1981

[51] Int. Cl.³ ............................................. H03K 13/24
[52] U.S. Cl. ............................... 340/347 DD; 360/42; 360/44
[58] Field of Search ...................... 360/40, 38, 39, 41, 360/42, 43, 44; 340/347 DD

[56] References Cited

U.S. PATENT DOCUMENTS 3,685,033  8/1972  Srivastava ................... 340/347 DD
3,988,729  10/1976  Herman ....................... 340/347 DD

FOREIGN PATENT DOCUMENTS 7721061 of 0000 France .

Primary Examiner—C. D. Miller
Attorney, Agent, or Firm—Fleit & Jacobson

[57] ABSTRACT

A method and apparatus for encoding or decoding data in accordance with a coding format, referred to herein as Yφ and which is based on the 3PM coding format. Data encoded in accordance with the Yφ format is generated by initially encoding, at a prearranged clocking frequency, binary data in accordance with 3PM format, applying such encoded data to one input terminal of an exclusive OR gate and applying clocking pulses, at the prearranged frequency to the other input terminal. Decoding is similarly achieved by passing the encoded data through an exclusive OR gate. Data encoded according to the Yφ format is particularly advantageous on account of the relatively high density of flux transitions which it generates, which may be desirable in certain circumstances particularly if both high and low rate data is to be encoded on the same magnetic tape.

4 Claims, 7 Drawing Figures

Fig. 3

| NRZ | $P_1$ | $P_2$ | $P_3$ | $P_4$ | $P_5$ | $P_6$ |
|---|---|---|---|---|---|---|
| 0 0 0 | 0 | 0 | 0 | 0 | 1 | 0 |
| 0 0 1 | 0 | 0 | 0 | 1 | 0 | 0 |
| 0 1 0 | 0 | 1 | 0 | 0 | 0 | 0 |
| 0 1 1 | 0 | 1 | 0 | 0 | 1 | 0 |
| 1 0 0 | 0 | 0 | 1 | 0 | 0 | 0 |
| 1 0 1 | 1 | 0 | 0 | 0 | 0 | 0 |
| 1 1 0 | 1 | 0 | 0 | 0 | 1 | 0 |
| 1 1 1 | 1 | 0 | 0 | 1 | 0 | 0 |

MAGNETIC RECORDING

This invention relates to the recording of data or information on magnetic tape, and in particular it relates to the coding format used in such recordings.

Data or information is commonly recorded on magnetic tape in the form of a train of binary bits, and the efficiency with which such recordings may be achieved is determined, to a significant extent, by the coding format employed to represent the data.

A known format is the NRZ-L (Non-Return to Zero) code in which the tape assumes a state of either full positive or full negative saturation, a magnetic flux transition occurring between these states whenever the value of the binary bit changes. It follows, therefore, that the maximum density of flux transition equals the maximum bit density.

Another commonly used form of coding is the 2FM (Frequency Doubling) code whereby a binary ONE is represented by a transition at the centre of a bit cell, a binary zero is represented by the absence of such a transition, and a transition occurs at the boundary between each adjacent pair of bit cells. The maximum bit density, therefore, is only one half the maximum flux transition density.

The form of coding which is used can be important since the output from the reproduce head tends to fall sharply as the spacing between recorded flux transitions approaches the width of the reproducer head gap, and a particular recorder/reproducer system may only reliably resolve flux transition densities of up to a maximum value. Typically this value may be about 30K flux transitions per inch and so if the NRZ coding format is used a maximum bit packing density of 30kbpi could be tolerated, whereas in the case of 2FM coding, the maximum tolerable bit packing density would only be half this value.

Since the rate of data input (i.e. the bit rate, BR) and the bit packing density (PD) are related to the tape speed (TS) by the simple expression, $$TS = (BR/PD)$$

the choice of an appropriate code may be especially important when relatively high bit rates are used. In such circumstances a particularly useful code us that known as the 3PM (3 Position Modulation) code since, as will be described in greater detail below, the maximum bit packing density which can be achieved actually exceeds the maximum density of flux transitions by a factor of 3/2. Thus a flux transition density of 30K transitions per inch becomes equivalent to a bit packing density of 45kbpi, thereby increasing the amount of data which a given length of tape can accommodate.

Although the use of 3PM coding can be advantageous when relatively high bit rates prevail, problems may be encountered if relatively low bit rates are used, since reproduction tends to be rather unreliable unless the bit rate exceeds a maximum value, typically around 40kbps. It will be appreciated, therefore, that recording difficulties could arise when data transmitted at both high and low rates must be recorded on the the same tape. In these circumstances, a tape speed suitable for reliability and economically recording the high density data, is frequently found to be incompatible with that required for the low density data.

It is an object of the invention to provide an improved method and system for recording digital data whereby the abovementioned problems may be reduced.

According to one aspect of the invention there is provided a method of encoding binary data signals comprising the steps of encoding said data signals, at a prearranged clocking frequency according to the 3PM format, applying the encoded data signals to one input terminal of an exclusive OR gate and applying clocking pulses, at said prearranged frequency, to the other input terminal, and receiving encoded output signals generated at the output terminal of said OR gate.

According to another aspect of the invention there is provided a method of decoding data signals generated by a method according to claim 1 comprising the steps of, applying the signals to be decoded to one input terminal of an exclusive OR gate, applying clocking pulses at said prearranged frequency to the other input terminal, to generate, at the output terminal thereof, signals encoded according to the 3PM format, and decoding the signals generated at said output terminal.

According to a further aspect of the invention there is provided an apparatus for encoding binary data signals comprising means for encoding said data signals, at a prearranged clocking frequency, according to the 3PM format, and an exclusive OR gate for receiving said encoded signals at one input terminal, and for receiving clocking pulses, at said prearranged frequency, at the other input terminal, and means for receiving at an output location encoded data signals generated at the output terminal of said OR gate.

According to yet another further aspect of the invention there is provided an apparatus for decoding data signals generated by an apparatus as described in the immediately preceding paragraph, an exclusive OR gate for receiving the signals to be decoded at one input terminal and for receiving clocking pulses at said prearranged frequency at the other input terminal, so as to generate at the output terminal thereof data signals encoded in accordance with the 3PM format, and means for decoding the signals generated at the output terminal.

Figure 2:
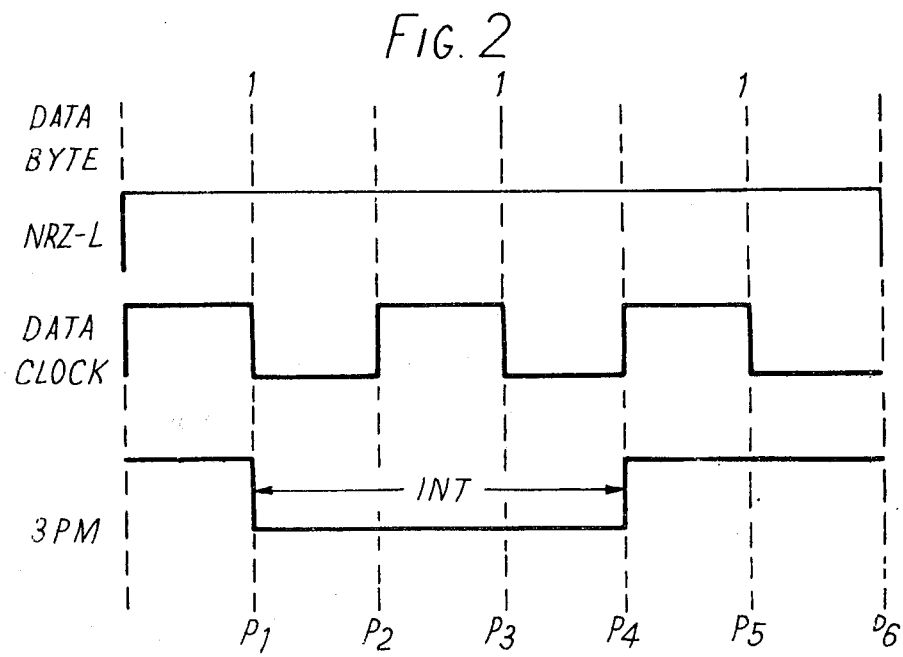
Figure 4:
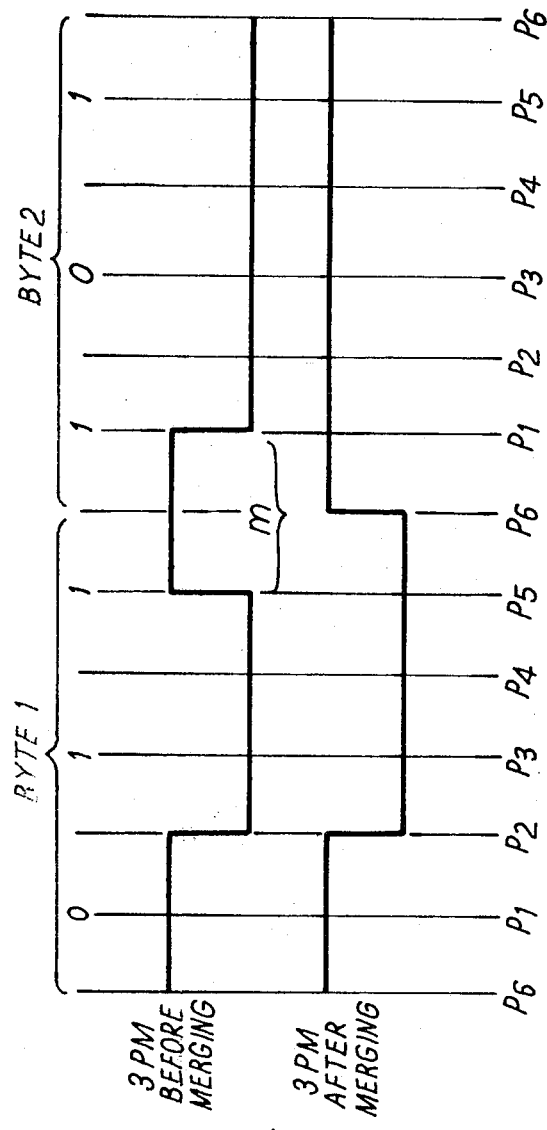
Figure 5:
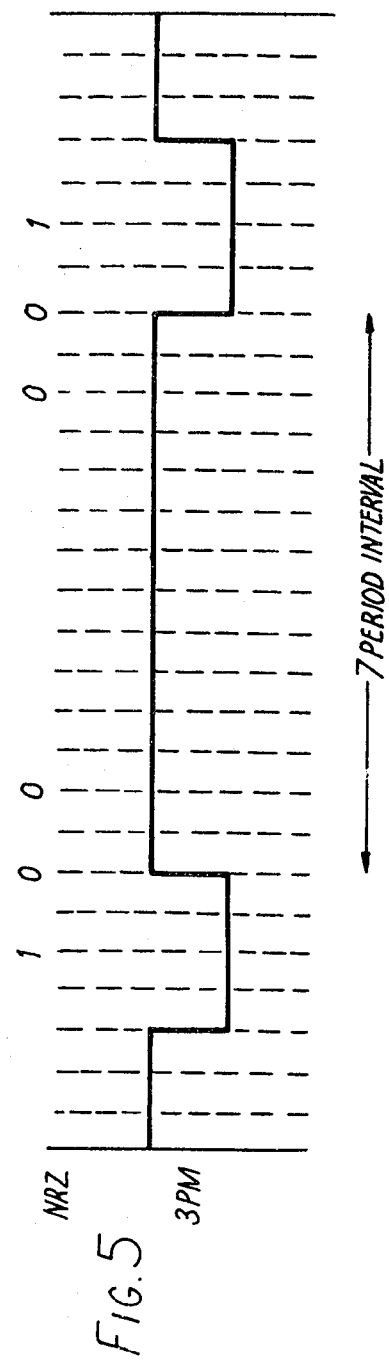
Figure 6:
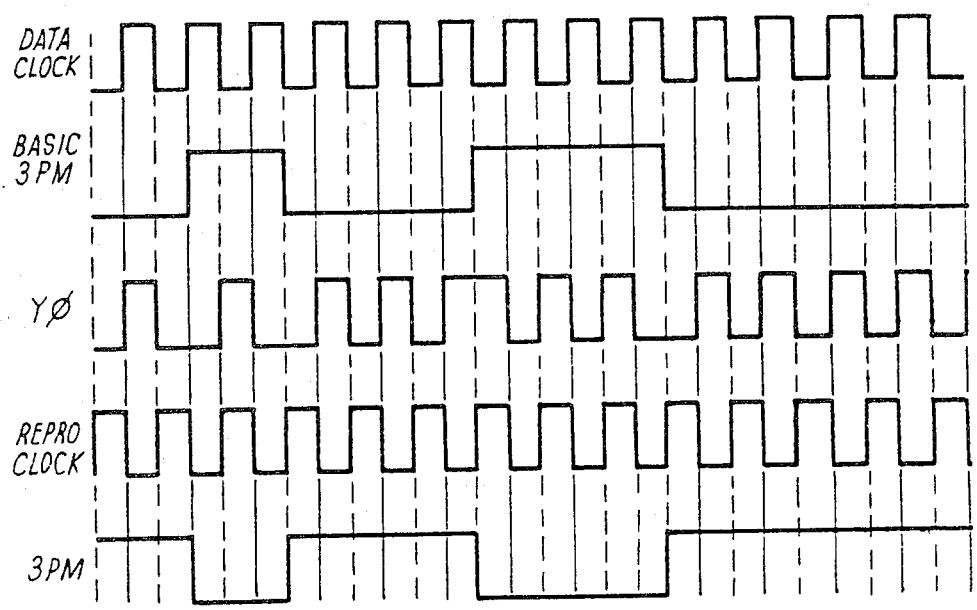
Figure 7:
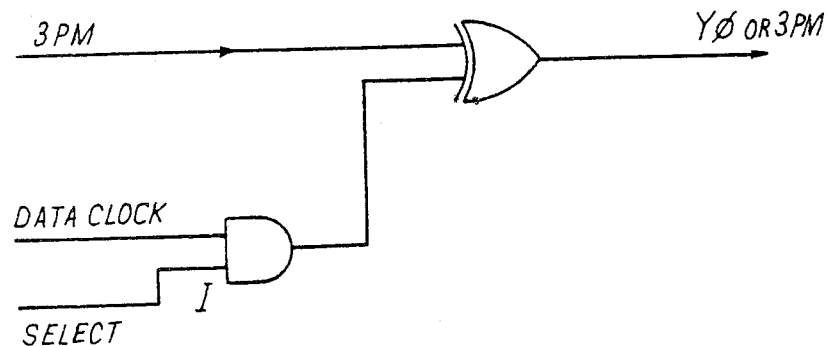

In order that the invention may be more readily understood and carried into effect one embodiment thereof is now described, by way of example only, by reference to the accompanying drawings of which, FIGS. 1a and 1b show two sets of binary data encoded according to the 2FM and NRZ(L) formats respectively, FIG. 2 shows an example of binary data encoded according to the 3PM coding format, FIG. 3 shows a table of rules which are applied to generate the 3PM code, FIG. 4 illustrates a particular rule for generating the 3PM code, FIG. 5 shows the generation of a marker using 3PM coding, FIG. 6 illustrate the encoding and decoding of data in accordance with Yφ format, and FIG. 7 shows an circuit used for encoding data in accordance with the Yφ format.

Referring to the drawings, FIGS. 1a and 1b illustrate two sets of binary data encoded according to the 2FM and NRZ(L) formats respectively. It will be seen that the frequency of flux transitions is identical in both these examples yet, as described above, the number of bits conveyed by the NRZ(L) code is twice that conveyed by the 2FM code. Thus by changing the coding format it is possible to significantly alter bit packing density.

The 3PM code, and its mode of generation will now be described by reference to FIGS. 2, 3 and 4. The code is derived by dividing the binary data into groups of three bits, each group being referred to as a byte. As shown in FIG. 2, each byte is divided into six equal half periods defined by the frequency of a data clock and the boundaries between adjacent intervals are referred to as "positions" which are designated $P_1$–$P_6$. Each three bit byte is encoded in accordance with a set of rules tabulated in FIG. 3, the entry of a "1" or a "0" in the table being respectively indicative of the presence or absence of a flux transition at the corresponding "position" in the byte. As illustrated in FIG. 2, therefore, when the data byte 111 is encoded transitions are generated only at the positions $P_1$ and $P_4$ so that an interval INT, $1\frac{1}{2}$ data clock periods long is produced. It will be appreciated by inspection of the table that one or two transitions can occur in each byte, but it is an important rule of 3PM coding that there must be at least two transition free positions between adjacent transitions, that is the minimum interval between transitions is $1\frac{1}{2}$ data clock periods. It sometimes occurs that only one such transition free "position" is generated, at $P_6$, and this situation arises for example, when the bytes 011 and 101 are arranged serially, as illustrated in the upper part of FIG. 4. To preserve the minimum $1\frac{1}{2}$ period interval in these circumstances, the transitions flanking the transition free position are merged, as illustrated in the lower part of FIG. 4 so as to form a single transition at $P_6$, and to accommodate such merging a transition is never assigned to the position $P_6$ in the table of FIG. 3.

It follows from the above-mentioned coding rules that the possible intervals between adjacent transitions are $1\frac{1}{2}$, 2, $2\frac{1}{2}$, 3, 4, $4\frac{1}{2}$, 5, $5\frac{1}{2}$, and 6 clock periods. The longest period of 6 clock periods for example, is generated whenever the data bits 101000 are preceded by 000 or 011 or 110 and followed by 101, or 110 of 111.

As described-above the 3PM coding format is especially convenient when data is transmitted at a high bit rate since the maximum flux transition density is only $\frac{2}{3}$ the maximum bit packing density. Moreover as shown in FIG. 5 a marker can be very conveniently provided by generating a seven period interval symmetrically within a ten period window.

Although 3PM coding serves to extend the upper limit of the bit packing density this feature may prove to be rather inconvenient when relatively low bit rates are used, and as discussed above this may be especially true when data transmitted at both high and low bit rates is to be recorded on the same tape.

In a particular application, for example, it was necessary to record a 50Mbps serial bit stream, fanned out over 22 tracks, on the same tape as a 100kbps stream fanned out over 2 tracks, thus necessitating the recording of (50/22)=2.272Mbps data on the same tape as (100/2)=50kbps data.

Assuming a bit packing density of 30kbpi for the high rate data the resulting tape speed is around 75ips, and so the low rate data, recorded at the same speed, would have a bit packing density of only 666bpi. In these circumstances, since a 6 interval data period and a 7 interval marker could occur successively it is possible that the recorded waveform could have a significant low frequency component of around 3.5 kHz, which cannot be reproduced with reliability.

In accordance with the present invention, however, the problem of recording both high and low rate data at the same tape speed has been substantially overcome by generating a new code, which is referred to herein as $Y\phi$ and which is based on the 3PM code. This new code is generated by combining, in an exclusive OR gate, both the 3PM waveform and the clock pulse waveform used to define the length of a coding interval. This procedure is illustrated in FIG. 6 wherein waveform (a) represents the data clock pulses, waveform (b) represents data encoded in accordance with the 3PM format and waveform (c) represents the same data encoded in accordance with the $Y\phi$ format and which is derived by combining waveforms (a) and (b) in an exclusive OR gate. A comparison of waveforms (b) and (c) shows that data generated in accordance with the $Y\phi$ code is represented by the absence rather than the presence of flux transitions and the density of flux transitions tends to be rather high, a factor which favours recording at relatively low bit rates. In fact, it is found in practice that bit rates as low as 5kbps can be tolerated when data is encoded using the $Y\phi$ format, in comparison with 40kbps when 3PM coding is used. A further advantage of $Y\phi$ encoding is that the 7 interval marker encoded in 3PM format is still readily identified and becomes a unique group of 13 consecutive transitions.

Circuits are known for encoding or decoding data in accordance with the 3PM format—see for example, French patent application No. 7721061 (Publication No. 2358786) and to generate data encoded in accordance with the new $Y\phi$ format of the present invention, the 3PM output from such a circuit is passed to an exclusive OR gate together with the data clocking pulses, as shown in FIG. 7. In this illustrated example, the data clocking pulses are selectively applied to the OR gate 10 via an AND gate 20, so that in dependence on whether the input I to the AND gate is set at a high or low level, data respectively encoded in accordance with $Y\phi$ or 3PM formats is generated at the output from the OR gate. It will be appreciated that data may be converted back to 3PM data in a similar manner using the same circuit and this process is demonstrated by waveforms (d) and (e) in FIG. 6.

What we claim is:

1. An apparatus for encoding binary data signals comprising means for encoding said data signals, at a prearranged clocking frequency, according to the 3PM format, and an exclusive OR gate for receiving said encoded signals at one input terminal, and for receiving clocking pulses, at said prearranged frequency, at the other input terminal, and means for receiving at an output location encoded data signals generated at the output terminal of said OR gate.

2. An apparatus for decoding data signals generated by an apparatus according to claim 1, comprising,
   an exclusive OR gate for receiving the signals to be decoded at one input terminal and for receiving clocking pulses at said prearranged frequency at the other input terminal, so as to generate at the output terminal thereof data signals encoded in accordance with the 3PM format, and
   means for decoding the signals generated at the output terminal.

3. A magnetic recording apparatus including an apparatus for encoding binary data signals comprising means for encoding said data signals at a prearranged clocking frequency, according to the 3PM format and an exclusive OR gate for receiving said encoded signals at one input terminal and for receiving clocking pulses, at said prearranged frequency, at the other input terminal and means for receiving, at an output location, encoded data signals generated at the output terminal of said OR gate, the recording apparatus further including means for selectively recording the data generated at the output terminal of said OR gate or encoded according to the 3PM format at respective relatively high or low rates.

4. A magnetic recording apparatus according to claim 3 including a further exclusive OR gate for receiving at one input terminal signals recorded at said relatively high rate and for receiving clocking pulses at said prearranged frequency at the other input terminal so as to generate at the output terminal thereof data signals encoded in accordance with the 3PM format, and means for decoding the signals generated at said output terminal of the further exclusive OR gate.

* * * * *